US008256309B2

(12) United States Patent
Bowen et al.

(10) Patent No.: US 8,256,309 B2
(45) Date of Patent: Sep. 4, 2012

(54) APPARATUS AND METHOD FOR DETECTING BREAKS IN SCREENS

(75) Inventors: Charles T. Bowen, Hebron, KY (US); Robert A. Lunnemann, Florence, KY (US); Joachim M. Zaun, Fort Thomas, KY (US)

(73) Assignee: M-I L.L.C., Houston, TX (US)

( * ) Notice: Subject to any disclaimer, the term of this patent is extended or adjusted under 35 U.S.C. 154(b) by 249 days.

(21) Appl. No.: 12/679,637

(22) PCT Filed: Sep. 26, 2008

(86) PCT No.: PCT/US2008/077861

§ 371 (c)(1), (2), (4) Date: Mar. 23, 2010

(87) PCT Pub. No.: WO2009/042870

PCT Pub. Date: Apr. 2, 2009

(65) Prior Publication Data

US 2010/0192676 A1 Aug. 5, 2010

(51) Int. Cl.
*G01N 19/00* (2006.01)

(52) U.S. Cl. .................................................... 73/865.9

(58) Field of Classification Search ........................ None
See application file for complete search history.

(56) References Cited

U.S. PATENT DOCUMENTS 6,585,116 B1 7/2003 Doelle et al.
6,997,325 B2 2/2006 DeCenso
7,182,207 B2 2/2007 DeCenso
7,219,805 B2 * 5/2007 DeMaison .................... 209/246
2007/0163927 A1 * 7/2007 Eia ................................ 209/378
2009/0126468 A1 * 5/2009 Hideno et al. ............... 73/61.63

OTHER PUBLICATIONS

International Search Report and Written Opinion, mailed Feb. 26, 2009, for PCT/US2008/077861.

* cited by examiner

*Primary Examiner* — Robert R Raevis
(74) *Attorney, Agent, or Firm* — Dave Cate; Kimberly Ballew; Josh Smith

(57) ABSTRACT

An apparatus for detecting a break in a screen of a vibratory separator includes an infeed section coupled to the housing such that at least a portion of the material passing through the screen and directed from the housing is directed through the infeed section, a detector screening element receiving material from the infeed section, wherein the detector screening element has a plurality of openings having a size equal to or slightly larger than the opening size of the screen in the vibratory separator, and a level sensor positioned above the detector screening element, wherein the level sensor is positioned to detect material build up on the detector screening element. A method for detecting a break in a screen of a vibratory separator includes the steps of directing at least a portion of material that passes through the screen to a detector screening element including a detector screening element having a plurality of openings having a size equal to or slightly larger than the opening size of the screen in the vibratory separator, detecting when the material directed to the detector screening element builds up to a predetermined level and sending a signal in response to the detection of materia! build up to the predetermined level.

19 Claims, 4 Drawing Sheets

APPARATUS AND METHOD FOR DETECTING BREAKS IN SCREENS

BACKGROUND OF INVENTION

The field of the present invention is material separation through screening or filtering and break detection for the porous elements employed.

Separator systems are used in industry for a variety of undertakings. They are used to process dry materials and liquid/solid slurries. Each one typically functions by first introducing a flow of material to a porous element such as a screen or filter, usually of woven wire mesh or a porous membrane. The flow of material is separated into two streams, one containing material that passes through the porous element, the other containing material that is too large to pass through the porous element. A drive mechanism may be operatively coupled with a housing to produce a vibrating motion that serves to put the material on the porous element in motion until it either passes through or is pushed off the element at the periphery thereof. Other devices use pressure to increase flow through a membrane with cycled application including reverse flow to clear the material that is too large to pass through the membrane.

Such separator systems employ screens in rectangular and circular forms with screen elements tensioned on frames or with hooks tensioned on the separator itself. The screen elements range greatly in porosity and can be of a single element or of laminated elements. The separator frames can be vibratory or fixed and, when vibratory, supported by a variety of means such as springs, bushings or links. Such systems alternatively employ filters, tensioned or untensioned, supported or unsupported and of widely varying porosities and shapes including rectangular, circular, cylindrical and bag shaped. Many additional features are, of course, available such as housing covers, elaborate manifolds and various and changeable motions, rates and cycles. Patents disclosing a small sampling of such systems and components include U.S. Pat. Nos. 4,022,693; 4,251,354; 4,582,597; 4,613,432; 4,655,911; 4,968,366; 5,032,210; 5,051,171; 5,134,893; 5,221,008; 5,226,546; 5,242,058; 5,255,789; 5,265,730; 5,271,504; 5,456,365; 5,950,841; 6,089,380; 6,202,856; 6,349,834; 6,431.368; and 6,513,665, the disclosures of which are incorporated herein by reference.

Materials typically screened vary considerably in their particle size, bulk density, chemical composition, temperature, moisture content and other physical and chemical characteristics. Any particular separator system in a given processing plant is likely dedicated to handling a single material with consistent properties. Examples of such materials, to show the diversity but not to provide a comprehensive list, include: abrasives, activated carbon, calcium carbonates, ceramic slurries, chlorine compounds, citric acid, fertilizers, flours, food products, gunpowder, minerals, paper coating slurries, pharmaceuticals, pigments, polystyrene beads, powdered metals, powdered paints, printing inks, PVC powder, refractories, rocket propellants, and starches.

As a result, various screen configurations, vibration profiles and environments are employed to maximize efficiency and the quality of the resulting processed materials.

By far the most common failure mode for separator systems is the failure of the porous element. Screens, for example, are typically made of finely woven wire cloth drawn taut by a screen frame or tensioning apparatus on the separator. Failure is caused by numerous factors such as wear and fatigue failure. Such failures typically occur as breaks in the screening media itself resulting in a damaged screen. Such breaks may manifest themselves as tears (a series of mutually adjacent broken wires), punctures (tears in two directions) or holes (missing portions of the screening material). Once the screen has failed, the function of a separating system is compromised. At a minimum, it can no longer be relied upon to separate all oversized material because such material can now pass through the break in the screen. Worse, it can result in fragments of the failed screen contaminating the material being screened, presenting a serious hazard in food or pharmaceutical screening operations. Similar failure occurs in filter elements.

As the porous elements are typically located within closed housings or under material being processed, it is difficult to visually detect such failures. Thus, where critical separation is demanded, frequent inspection is advisable. As such efforts to insure quality separation result in downtime and labor and still result in compromised processed material, methods for detecting breaks have been long sought. Systems have been devised that attempt to detect screen failure by measuring the electrical or optical paths through the mesh screen itself See U.S. Pat. No. 5,996,807, the disclosure of which is incorporated herein by reference. These are believed to have been proven impractical and have not met with general market acceptance. Other systems have been devised that detect screen failure by utilizing an RF signal to detect screen breaks. See U.S. Pat. No. 6,997,732, the disclosure of which is incorporated herein by reference. While effective, such a system is not yet a cost effective solution.

SUMMARY

In one aspect, the disclosed subject matter is generally directed to an apparatus for detecting a break in a screen of a vibratory separator. The vibratory separator includes a screen secured with in a housing and having a plurality of openings sized for separating material deposited thereon, and a throughs outlet located below the screen for removing material that passes through the screen from the housing. The break detection apparatus includes an infeed section coupled to the housing such that at least a portion of the material passing through the screen and directed from the housing is directed through the infeed section, a detector screening element receiving material from the infeed section, wherein the detector screening element has a plurality of openings having a size equal to or slightly larger than the opening size of the screen in the vibratory separator, and a level sensor positioned above the detector screening element, wherein the level sensor is positioned to detect material build up on the detector screening element.

In another aspect the disclosed subject matter is generally directed to a vibratory separator including a base, a housing elastically mounted to the base, a vibration generator for imparting motion to the housing at an advantageous frequency and amplitude, a screen secured with in the housing and having a plurality of openings sized for separating material deposited thereon, a throughs outlet located below the screen for removing material that passes through the screen from the housing, and a break detector coupled to the housing below the screen for receiving at least a portion of material that passes through the screen in the housing. The break detector includes an infeed section coupled to the housing to receive at least a portion of the material passing through the screen, a detector screening element receiving material from the infeed section, wherein the detector screening element has a plurality of openings having a size equal to or slightly larger than the opening size of the screen in the vibratory separator, and a level sensor positioned above the detector screening element, wherein the level sensor is positioned to detect material backup on the detector screening element.

In yet another aspect, the disclosed subject matter is generally directed to a method for detecting a break in a screen of a vibratory separator, wherein the vibratory separator includes a screen secured with in a housing and having a plurality of openings sized for separating material deposited thereon, a vibration generator for imparting motion to the housing, and a throughs outlet located below the screen for removing material that passes through the screen from the housing. The method includes the steps of directing at least a portion of material that passes through the screen to a detector screening element including a detector screening element having a plurality of openings having a size equal to or slightly larger than the opening size of the screen in the vibratory separator, detecting when the material directed to the detector screening element builds up to a predetermined level, and sending a signal in response to the detection of material build up to the predetermined level.

Other aspects and advantages of the disclosed subject matter will be apparent from the following description and the appended claims.

DETAILED DESCRIPTION

In one aspect, embodiments disclosed herein relate to an apparatus and method for detecting breaks in a screen used in a vibratory separator. More specifically embodiments disclosed herein relate to an apparatus and method to detect breaks in sieving screening elements to prevent off-specification product from entering the product flow downstream from a gyratory or vibrating separator.

The term "vibratory separator," as used herein, refers generally to a variety of separators utilizing a screen and motion to separate particles based on size or solids from liquids. Such separators include sifters, shakers, and gyratory separators.

Figure 1:
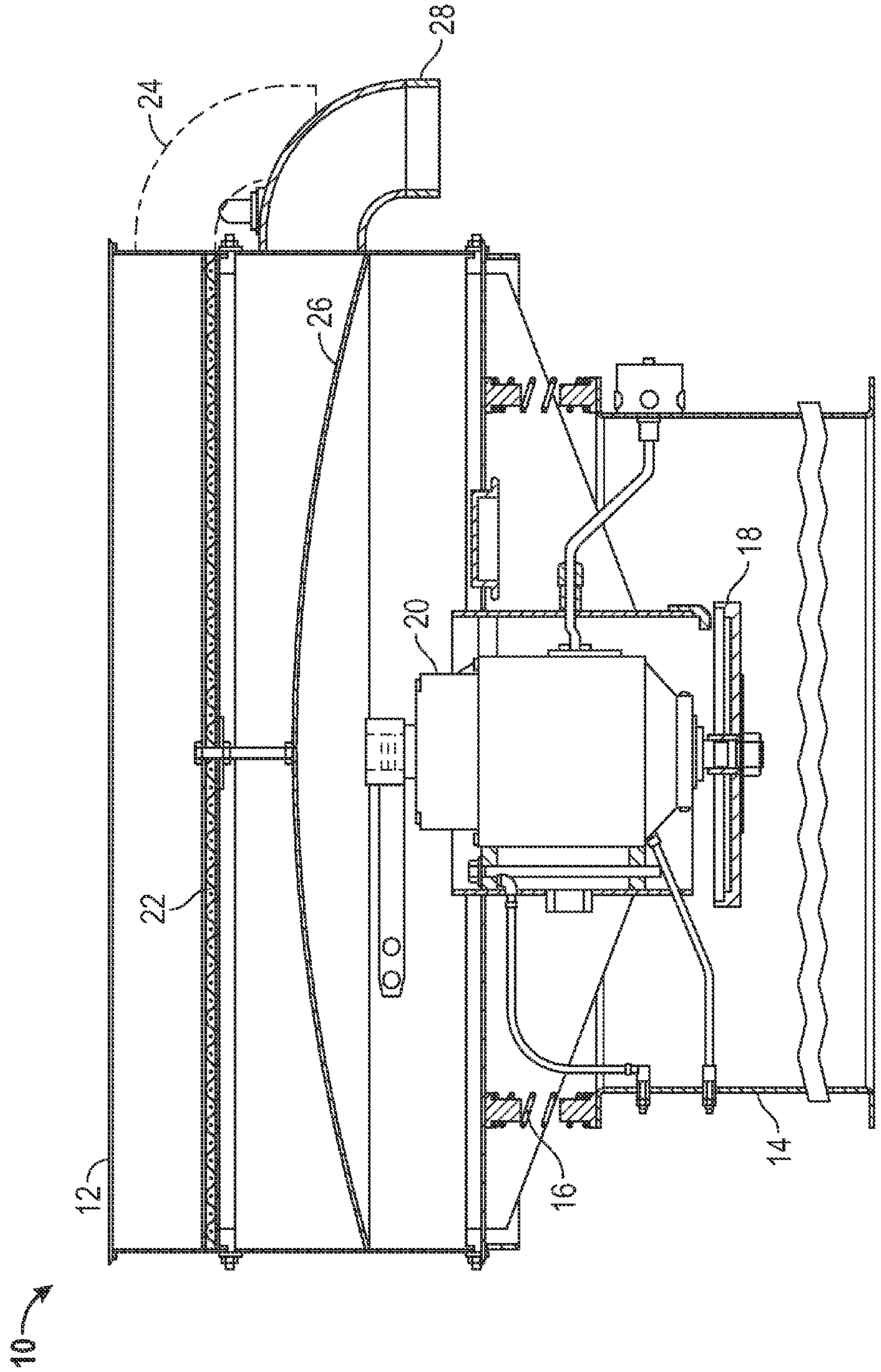
FIG. 1 (Prior Art)
FIG. 1 is a cutaway view of a break detection apparatus in accordance with an embodiment of the present disclosure.

Referring to FIG. 1, a conventional vibratory separator, generally designated 10, is depicted to provide context for a material separation system for detecting breaks in a screening element. Nonvibratory screening systems and filtration systems in a range of such systems described above in the Background of the Invention can also find increased utility with an apparatus and method for detecting breaks in the screening element employed for material separation.

The separator 10 includes a housing 12 which is elastically mounted to a base 14 on springs 16. A vibration generator 18 driven by a motor 20 causes the elastically mounted housing 12 to vibrate at an advantageous frequency and amplitude for material screening or filtering. A porous element, which is a screen 22 in this embodiment, extends across the housing 12 to separate material deposited thereon by selected characteristics. The screen 22 includes a plurality of openings of a predetermined size. The material deposited on the screen 22 may include particles having a size larger than the openings in the screen 22 such that these particles do not fall through the screen 22 so long as there are no breaks in the screen 22. Particles that do not fall through the screen are often called, "overs." The material deposited on the screen 22 may also include particles having a size smaller than the openings in the screen 22. These particles will fall through the screen and are often called "throughs."

Above the screen 22 is an overs outlet 24. Particles that remain on top of the screen 22 are vibrated atop the screen 22 until they eventually reach the overs outlet 24 and are directed out of the separator 10.

In the embodiment shown in FIG. 1, a domed manifold 26 is located below the screen 22. Particles that fall through the screen 22 fall onto the domed manifold 26. Because the domed manifold 26 is higher in the middle and lower at its edge, the throughs slide, bounce, or are otherwise directed towards the outer edge of the domed manifold 26. A throughs outlet may be located through the separator housing 12 near a portion of the edge of the domed manifold 26. The throughs outlet 28 may be a spout located through the housing 12 that directs the throughs out of the separator 10. The tangential spout may include a passage that directs throughs tangentially away from the housing. Some spouts may further include a conduit in at an end of the passage through which the throughs are gravity-fed to a collection container or other processing equipment.

Figure 2:
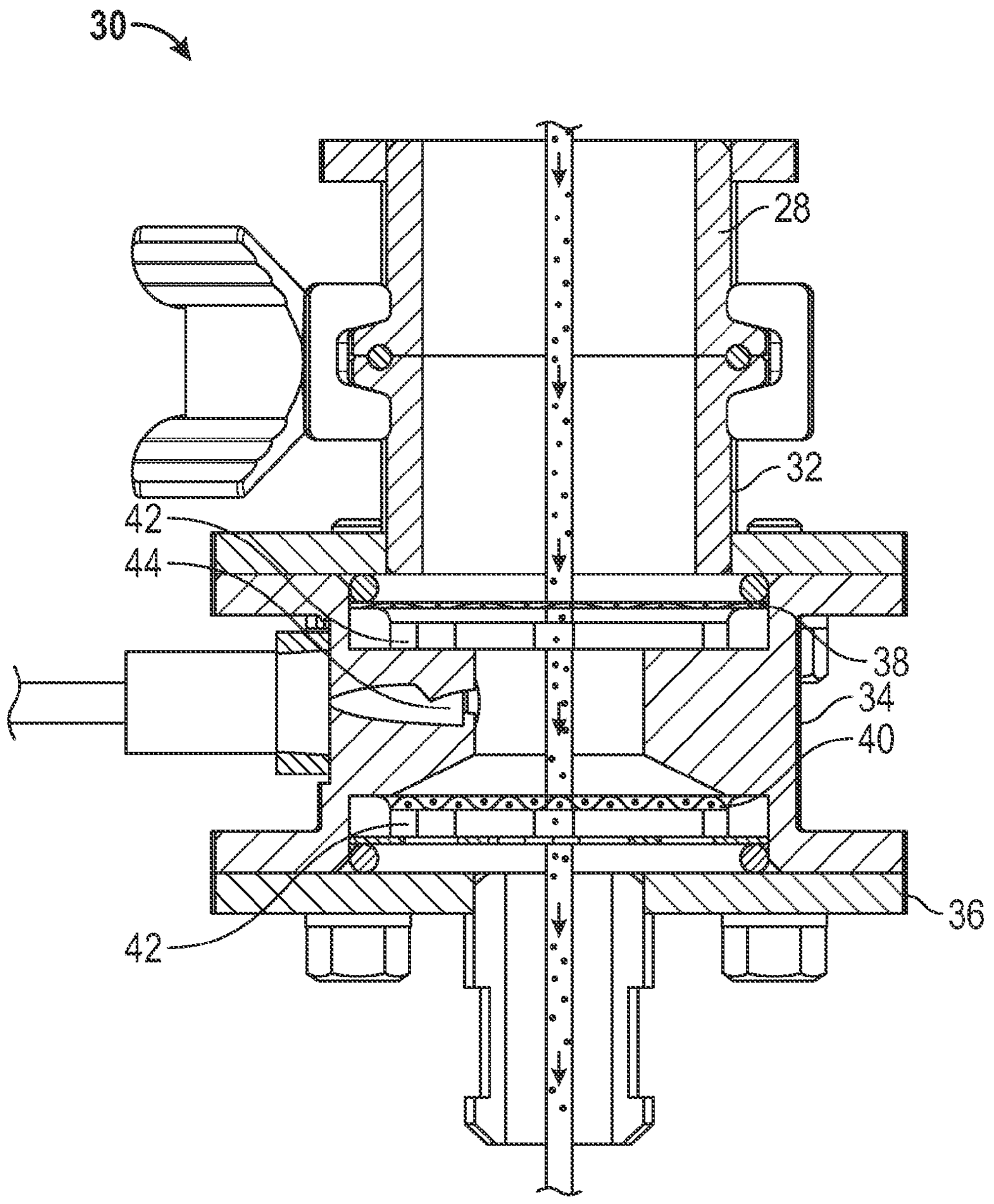
FIG. 2 is a cutaway view of a break detection apparatus in accordance with an embodiment of the present disclosure.
Figure 4:
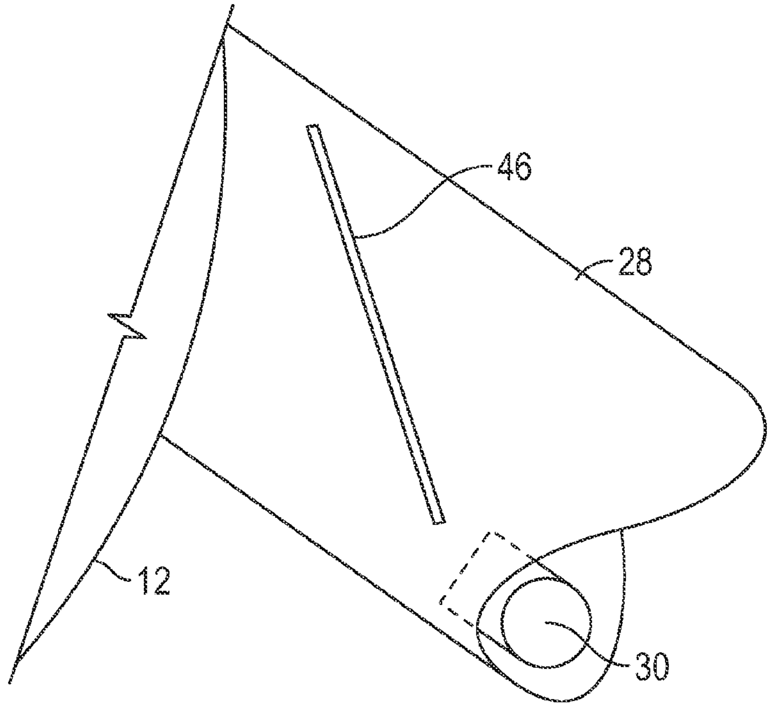
FIG. 4 is a schematic of a break detection apparatus in accordance with an embodiment of the present disclosure.
Figure 5:
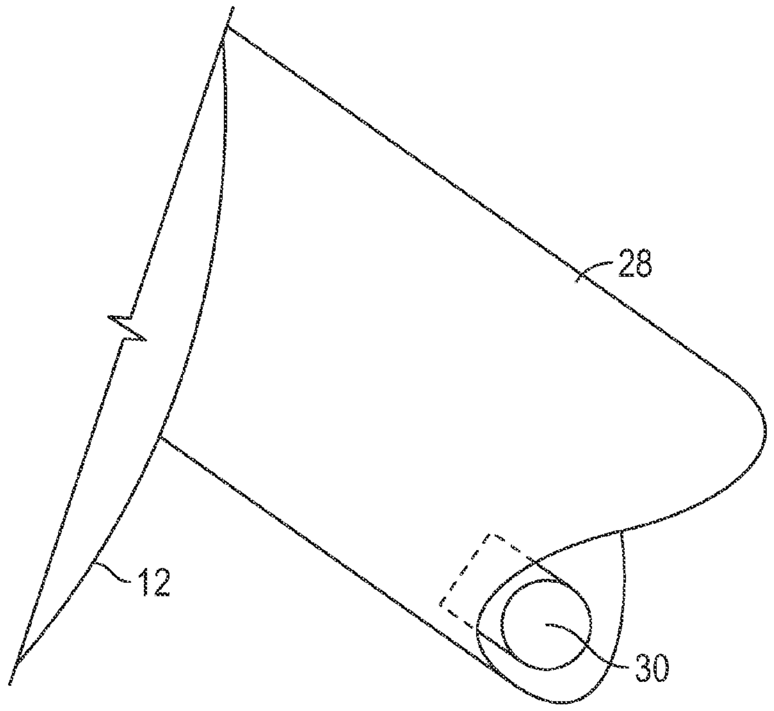
FIG. 5 is a schematic of a break detection apparatus in accordance with an embodiment of the present disclosure.

Referring to FIG. 2, an apparatus for detecting breaks in a screen is generally referred to herein as a break detector and shown by reference numeral 30. The break detector 30 is disposed in the throughs outlet 28 of the vibratory separator 20 in the embodiment shown. It will be appreciated by one of skill in the art that the break detector 30 could be disposed in other types of discharge areas where the finer product (also called "underflow") is collected for discharge, such as a tangential spout, discharge chute or discharge collector box. For example, a break detector of the present disclosure may be disposed in a tangential spout used, for example, to remove material that is of a size small enough to pass through a first screen having a first opening size, but too large to avoid passing through a second screen having a second opening size that is smaller than the opening size of the first screen. Referring to FIGS. 4 and 5, the break detector 30 may be disposed in a portion of the throughs outlet 28. Thus, not all of the throughs material has to enter the break detector 30.

Referring again to FIG. 2, the break detector 30 includes an infeed section 32, a center section 34, and a lower section 36. Material that passes through the screen 22 enters the break detector 30 through the infeed section 32. The infeed section 32 may be coupled to at least a portion of the throughs outlet 28. Alternatively, the infeed section 32 may be coupled to a secondary port near the throughs outlet 28. The infeed section 32 is coupled in a manner known by those of skill in the art, such as a clamping device, threaded fasteners, etc. so that the break detector 30 vibrates with the housing 12 and at the same rate as the housing 12.

A baffle fin 46 (shown in FIG. 4) may be installed in throughs outlet 28 to help direct material through the infeed section 32. The baffle fin 46 is helpful when there are low flow rates and material needs to be directed to the break detector 30. The baffle fin 46 may be positioned at a different angle relative to the throughs outlet 28 than that shown in FIG. 4 in order to direct a portion of the material towards the break detector 30 while the remaining material continues through the throughs outlet 28 directly.

Returning to FIG. 2, as previously discussed, at least a portion of the material passing through the screen 22 is directed through the infeed section 32 to the break detector 30. The infeed section 32 may include an orifice plate 38. The orifice plate 38 has a plurality of openings to allow material to pass therethrough. The openings are sized so that the flow of material into the center section 34 is throttled and helps reduce the impact of material that is gravity-fed to a detector screening element 40. One or more cleaning elements 42 may be located under the orifice plate 38 to help prevent material from building up on the orifice plate 38. The cleaning elements are retained under the orifice plate such that they can slide or move beneath the orifice plate dislodge any agglomerated or near-hole-sized particles that may plug the openings in the orifice plate. The cleaning elements may be exciter rings, balls, or any other types of elements as are known in the art.

The detector screening element 40 has a plurality of screen openings sized the same as or slightly larger than the openings of the screen 22 in the separator 10. The detector screening element 40 may have slightly larger openings than the separator screen 22 to ensure that the throughs material continues through element 40 unencumbered and without build up on the detector screening element 40. To assist with the flow of material through the detector screening element, one or more cleaning elements 42' may be located underneath the detector screening element 40 and that vibrate with the break detector 30 to help prevent material build up on and plugging of the detector screening element 40. The cleaning elements 42' under detector screening element provide the same purpose as the cleaning elements 42 described with respect to the orifice plate. Further, the cleaning elements 42' may be exciter rings, balls, or any other elements known in the art. If a detector includes an orifice plate and cleaning elements 42 and 42', such cleaning elements 42 and 42' may or may not be the same type of cleaning element.

While the openings of detector screening element 40 may be larger than the openings of screen 22, care must be taken when selecting the opening size of detector screening element 40 so that the openings are not so large that particles considered more than slightly oversized based on the opening size of screen 22 are unable to pass through the openings in detector screening element 40. As will be described, in the event of a tear or hole in screen 22, larger, oversized material will be able to pass through screen 22. Thus, the opening size of the detector screening element 40 should be chosen based on several factors so that only slightly oversized particles (relative to the openings of screen 22) are able to pass through detector screening element 40. Factors considered when determining the size of the openings of detector screening element 40 include the opening size of screen 22, the particle size distribution of the material being sorted, the flow rate of the material and the type of material. As screen 22 develops tears, punctures, or holes the size of particles traversing through screen 22 becomes larger. As it is these types of breaks that are to be detected, the openings of detector screening element 40 should be sized accordingly.

The center section 34 includes a level sensor 44 positioned above the detector screening element 40 and below orifice plate 38. The level sensor 44 is positioned at a predetermined distance above the detector screening element 40. The predetermined distance is determined based upon the amount of build up of material on the detector screening element that is acceptable before such build up is detected. When the screen 22 in the separator 10 is intact (without breaks or holes), the material flows efficiently through the detector screening element 40 and is redirected back into the flow of throughs material from the separator 10. During this time, the level sensor 44 does not detect a build-up of material on the detector screening element 40.

Figure 3:
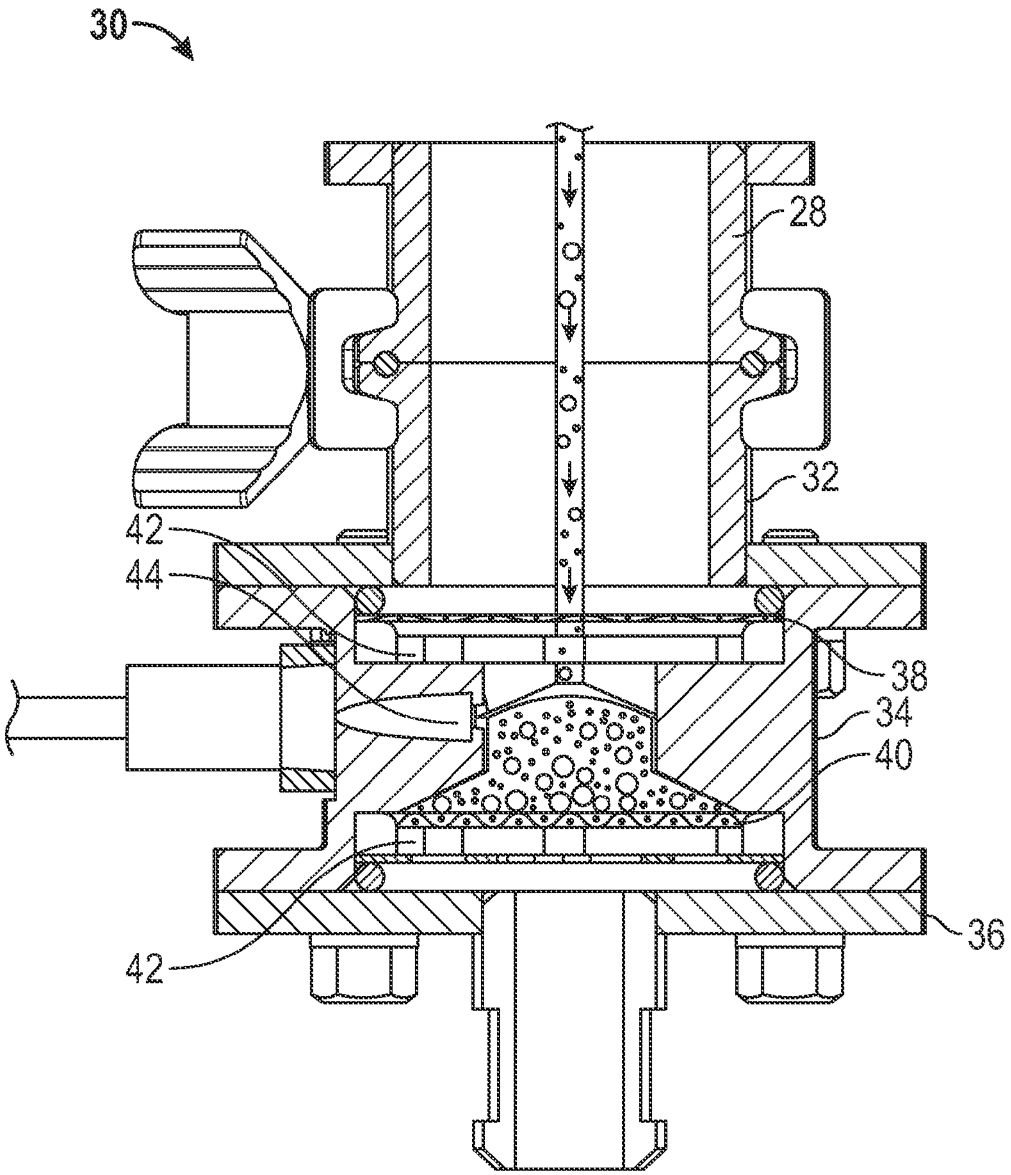
FIG. 3 is a front view of a vibratory separator including a break detection apparatus in accordance with an embodiment of the present disclosure.

Referring to FIG. 3, if the screen 22 in the separator has a break, such as a tear or hole, oversize product can pass through the screen 22 creating a mixture of material that includes both underflow, or throughs, and oversized product, "overs," that exit the separator 10. As previously described, material passing through the screen 22 is directed to the throughs outlet 28 and at least a portion of this is sampled through the break detector 30. The mixture of overs and throughs material travels onto the detector screening element 40. Since the oversized material (except that material which is only slightly oversized as discussed) is retained on top of the detector screening element 40, the material, including overs and throughs, starts to build up on top of the detector screening element 40 and backs up into the center section 34. When an amount of material backs up on the detector screening element 40 to the predetermined level sufficient to reach the level of the level sensor 44, the build up of material is detected by the sensor 44. At that time, the level sensor 44 sends a signal in response to the detection of material build up to the predetermined level. The signal may be used to stop the process and/or notify an operator as discussed below. Any type of level sensor 44 which can detect a build up of material may be used, including a proximity sensor.

When a backup of material is detected by the level sensor 44, a signal may be sent from the level sensor 44 directly or indirectly to stop the power to the motor 20 driving the vibration generator 18 and interrupt the separation process. Other upstream and/or downstream processing equipment may also be halted in response to the signal from the level sensor. In addition or alternatively, an audible alarm may be activated when a backup of material is detected by the level sensor 44. One of skill in the art will appreciate that there are also other ways to alert an operator of the detection of material backup on the detector screening element 40, including visual alerts such as lights, warnings on operator monitors, etc.

After the separation process is interrupted, whether automatically or manually, the defective screen in the separator 10 may be replaced with another screen 22. The break detector 30 is disassembled, cleaned, and reassembled so that it can be put back into surveillance with respect to the replaced screen 22.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus for detecting a break in a screen of a vibratory separator, wherein the vibratory separator comprises a screen secured with in a housing and having a plurality of openings sized for separating material deposited thereon, and a throughs outlet located below the screen for removing material that passes through the screen from the housing, the apparatus comprising:

an infeed section coupled to the housing such that at least a portion of the material passing through the screen and directed from the housing is directed through the infeed section;

a detector screening element receiving material from the infeed section, wherein the detector screening element has a plurality of openings having a size equal to or slightly larger than the opening size of the screen in the vibratory separator; and a level sensor positioned above the detector screening element, wherein the level sensor is positioned to detect material build up on the detector screening element.

2. The apparatus of claim 1, further comprising:

an orifice plate located in the infeed section, wherein material passes through the orifice plate before reaching the detector screening element.

3. The apparatus of claim 2, further comprising:

at least one cleaning element located under the orifice plate to prevent material from building up on the orifice plate.

4. The apparatus of claim 1, further comprising:

at least one cleaning element located under the detector screening element to prevent material from building up on the screening element.

5. The apparatus of claim 1, wherein the level sensor is a proximity sensor.

6. The apparatus of claim 1, further comprising:

a baffle fin located in the throughs outlet for directing material to the infeed section.

7. A vibratory separator comprising:

a base;

a housing elastically mounted to the base;

a vibration generator for imparting motion to the housing at an advantageous frequency and amplitude;

a screen secured within the housing and having a plurality of openings sized for separating material deposited thereon;

a throughs outlet located below the screen for removing material that passes through the screen from the housing; and a break detector coupled to the housing below the screen for receiving at least a portion of material that passes through the screen in the housing, wherein the break detector comprises:

an infeed section coupled to the housing to receive at least a portion of the material passing through the screen;

a detector screening element receiving material from the infeed section, wherein the detector screening element has a plurality of openings having a size equal to or slightly larger than the opening size of the screen in the vibratory separator; and a level sensor positioned above the detector screening element, wherein the level sensor is positioned to detect material backup on the detector screening element.

8. The vibratory separator of claim 7, wherein the break detector further comprises:

an orifice plate located in the infeed section, wherein material passes through the orifice plate before reaching the detector screening element.

9. The vibratory separator of claim 8, wherein the break detector further comprises:

at least one cleaning element located under the orifice plate to prevent material from building up on the orifice plate.

10. The vibratory separator of claim 7, wherein the break detector further comprises:

at least one cleaning element located under the detector screening element to prevent material from building up on the screening element.

11. The vibratory separator of claim 7, wherein the level sensor is a proximity sensor.

12. The vibratory separator of claim 7, further comprising:

a baffle fin located in the throughs outlet for directing at least a portion of the material that passed through the screen to the infeed section.

13. A method for detecting a break in a screen of a vibratory separator, wherein the vibratory separator comprises a screen secured with in a housing and having a plurality of openings sized for separating material deposited thereon, a vibration generator for imparting motion to the housing, and a throughs outlet located below the screen for removing material that passes through the screen from the housing, the method comprising:

directing at least a portion of material that passes through the screen to a detector screening element having a plurality of openings having a size equal to or slightly larger than the opening size of the screen in the vibratory separator;

detecting when the material directed to the detector screening element builds up to a predetermined level; and sending a signal in response to the detection of material build up to the predetermined level.

14. The method of claim 13, wherein detecting the material build up on the detector screening element comprises using a level sensor to determine when the material builds up to the predetermined level.

15. The method of claim 13, wherein detecting the material build up on the detector screening element comprises using a proximity sensor to determine when the material builds up to the predetermined level.

16. The method of claim 13, further comprising:

throttling the flow of material onto the detector screening element.

17. The method of claim 13, wherein sending the signal in response to the detection of material build up to the predetermined level comprises:

audibly alerting an operator when material has backed up on the detector screening element to the predetermined level.

18. The method of claim 13, wherein sending the signal in response to the detection of material build up to the predetermined level comprises:

stopping the vibration generator imparting motion to the housing when material has backed up on the detector screening element to the predetermined level.

19. The method of claim 13, wherein sending the signal in response to the detection of material build up to the predetermined level comprises:

visually alerting an operator when material has backed up on the detector screening element to the predetermined level.

* * * * *